United States Patent Office.

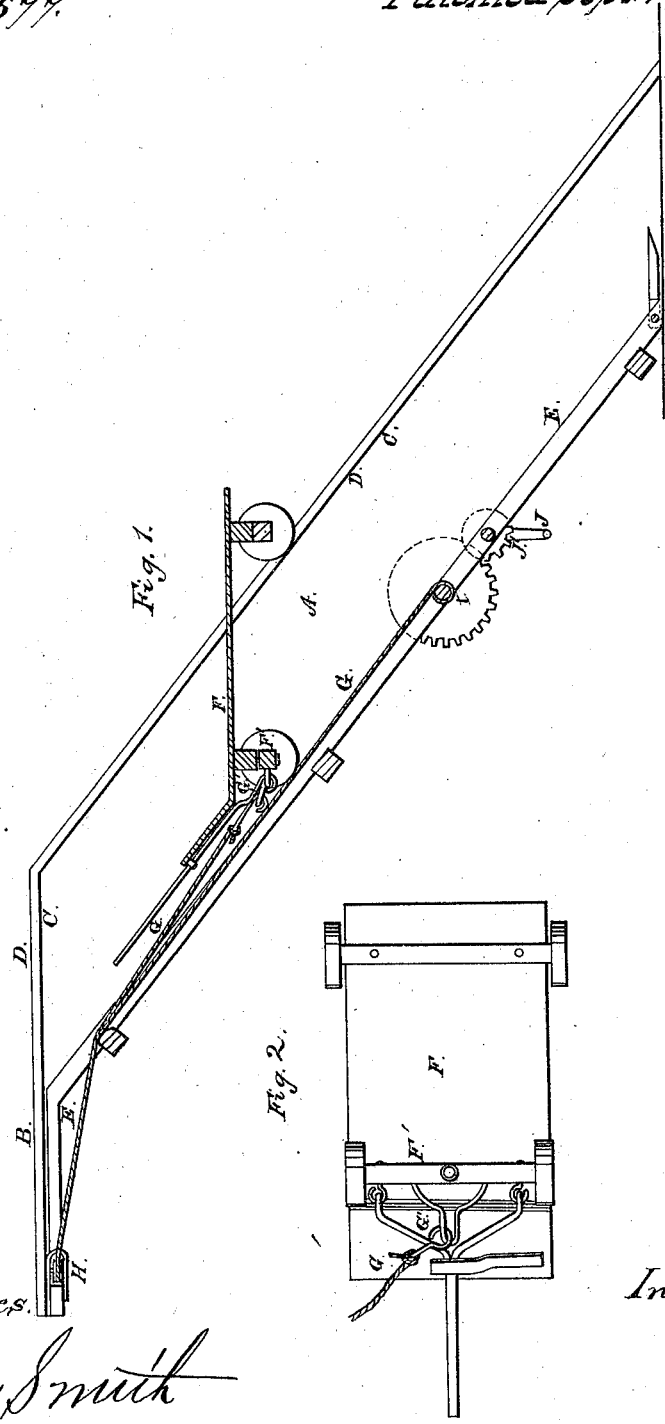

JOHN W. PEARCE, OF SUISUN, CALIFORNIA.

Letters Patent No. 81,677, dated September 1, 1868.

---

IMPROVED CAR AND TRACK FOR ELEVATING ON INCLINED PLANES.

---

The Schedule referred to in these Letters Patent and making part of the same.

---

TO ALL WHOM IT MAY CONCERN:

Be it known that I, JOHN W. PEARCE, of Suisun, county of Solano, State of California, have invented an Improved Car and Track for Elevating on Inclined Planes; and I do hereby declare the following description and accompanying drawings are sufficient to enable any person skilled in the art or science to which it most nearly appertains to make and use my said invention or improvement without further invention or experiment.

The principal object of my invention is to provide an improved device for unloading or discharging ships at their piers or wharves, and elevating merchandise or grain, when in sacks, from floor to floor in warehouses, although it may be employed for other purposes not herein enumerated.

My invention consists of a frame placed at an incline, and having incline ways at the top and bottom, on which a car is made to traverse up and down, by means of a rope attached to a windlass, passing through a pulley or block, and connected to the car. The frame and tracks assume a horizontal position at its upper end, and the construction of the car and tracks is such that the car maintains a horizontal position while ascending or descending the incline as well as when on a plane.

Referring to the drawings, forming a part of this specification, of which—

Figure 1 is a side sectional elevation,

Figure 2 is a bottom view of the truck—

A represents an incline frame, which is constructed so as to assume a horizontal position at B, its upper end. Tracks or ways C C are placed on the top of the frame, with flanges D D at each side. A second track, E E, is constructed at the bottom, resting on the cross-bars of the frame, and in close contact with the sides, until the track assumes the horizontal, when it is depressed only a little below the upper one.

The car F is constructed in the ordinary way of four-wheeled trucks, with the exception that the forward axle F' is shortened, so as to admit the wheels to ascend and descend on the lower track, yet all four of the wheels are of the same diameter, and the rear wheels may be provided with flanges, to take the place of the flanges D D at the top of the frame. The flanges on the front wheel may be on the inside, and those on the rear wheels on the outside, so as to keep the trucks firmly on the track.

The car may be loaded when in a horizontal position on the floor, or when partially up the incline on the tracks. A rope or tackle, G, is attached by a hook or other device to an eye, G', in front of the forward axle, and passes through a block, H, at the upper end of the frame, and from thence to a shaft, I, placed transversely across the frame, upon which it is wound by means of a crank, J, upon which is a pinion, J', which engages a wheel at the end of the shaft I, by which means the car is drawn up, the forward trucks or wheels passing up the lower track, and the rear wheels the upper track, while the car always maintains a horizontal position.

A suitable brake may be provided, so as to arrest the car at any point along the track.

Having thus described my invention, what I claim, and desire to secure by Letters Patent, is—

In combination with the double-inclined track, of the described construction, a store or freight-truck, having one axle shorter than the other, to adapt it to run on said track, and keep a horizontal position while passing up or down the same, substantially as described.

In witness whereof, I have hereunto set my hand and seal.

J. W. PEARCE. [L. S.]

Witnesses:
C. W. M. SMITH,
J. L. BOONE.